United States Patent [19]
Hankes

[11] Patent Number: 5,774,383
[45] Date of Patent: *Jun. 30, 1998

[54] PORTABLE COMPUTER FOR ONE-HANDED OPERATION

[76] Inventor: Elmer J. Hankes, 1768 Colfax Ave. South, Minneapolis, Minn. 55403

[ * ] Notice: The term of this patent shall not extend beyond the expiration date of Pat. No. 5,388,061.

[21] Appl. No.: 384,903

[22] Filed: Feb. 7, 1995

Related U.S. Application Data

[63] Continuation-in-part of Ser. No. 117,995, Sep. 8, 1993, Pat. No. 5,388,061.

[51] Int. Cl.⁶ ........................................................ G06F 1/00
[52] U.S. Cl. ........................................................ 364/708.1
[58] Field of Search ........................... 364/708.1, 709.12, 364/705.05; 400/489, 715, 488; 235/145 R, 146; 341/22; 345/158, 170

[56] References Cited

U.S. PATENT DOCUMENTS

| | | | |
|---|---|---|---|
| 4,571,456 | 2/1986 | Paulsen et al. | 364/708.1 |
| 4,754,268 | 6/1988 | Mori | 345/158 |
| 4,882,685 | 11/1989 | Van der Lely | 364/705.07 |
| 5,295,089 | 3/1994 | Ambasz | 364/708.1 |
| 5,307,297 | 4/1994 | Iguchi et al. | 364/708.1 |
| 5,410,497 | 4/1995 | Viletto | 364/708.1 |
| 5,488,571 | 1/1996 | Jacobs et al. | 364/708.1 |

*Primary Examiner*—Tan V. Mai
*Attorney, Agent, or Firm*—Moore & Hansen

[57] ABSTRACT

A portable computer with at least one reduced-key keypad for one-handed operation is disclosed. The preferred embodiment of the portable computer includes two data display screens for displaying data from two programs running simultaneously. It also includes two keypads, both of which are capable of entering the full range of alphanumeric characters and software control commands. An alternate embodiment may be modified to provide universal communication capabilities.

14 Claims, 5 Drawing Sheets

PORTABLE COMPUTER FOR ONE-HANDED OPERATION

This is a continuation-in-part of application Ser. No. 08/117,995, filed Sept. 8, 1993, U.S. Pat. No. 5,388,061.

BACKGROUND OF THE INVENTION

1. Technical Field

The present invention relates generally to portable computers, and particularly to portable computers that are small, lightweight and capable of one-handed operation.

2. Background Information

Portable computers have become increasingly common as the various components of computing technology are miniaturized. For example, powerful processors with minimal power requirements are becoming more commonplace, enabling computing power rivaling that of a desktop machine to be carried to remote locations and run off of a battery for several hours at a time. Similarly, displays of increasing clarity and resolution are also becoming available, enabling a relatively small screen to display a great deal of information without excessive eyestrain on the part of the computer user.

Further miniaturization is enabled when smaller keyboards are used. Indeed, the keyboard is in some cases the element of the computer that restricts the lower limits of downsizing. By reducing the number of keys required to address the full range of functions available from modern computer programs, the size of the portable computer itself may be greatly reduced without sacrificing any computing performance.

The approach taken by most portable computer manufacturers in the past has been to provide a keyboard with the full complement of keys, but to make the keys smaller and put them closer together. This approach results in awkward operation because a higher level of dexterity is required of the user, especially if the user is an adult with large fingers. Making the keys smaller and placing them closer together can result in the user's fingers running into each other and competing for the same space in the area immediately above the keyboard. When two hands are required for proper computer operation, as is virtually always the case, this situation is exacerbated.

Since the keyboards of present portable computers are limited in how small they can be made by the number of keys they require, it follows that the overall size and weight of the computers themselves are also similarly limited.

Additionally, traditional portable computers, which require two handed operation, must be set on a surface such as a table or the lap of the computer user to allow efficient operation. If the computer user attempts, for example, to cradle the computer is an arm while operating the keyboard with the other hand, the resulting operation is slow and cumbersome, at best.

While so-called hand-held computers operating on pen-based systems that require the use of a stylus and handwriting recognition software are presently available, the functionality of these systems is severely limited by the lack of available software that supports these systems. In addition, presently available hand-writing recognition software takes much time and effort to get used to, and the software, once it learns the handwriting of a particular user, does not recognize that of additional users.

The portable computer of the present invention overcomes difficulties described above and affords other features and advantages heretofore not available.

SUMMARY OF THE INVENTION

The present invention is a portable computer that uses a keyboard capable of addressing the full range of computer functions with a limited number of keys and one-handed operation. The preferred keyboard for one-handed operation is disclosed in Applicant's co-pending application serial number 08/974,223, filed Jun. 9, 1993. Various embodiments of the portable computer may include a monitor disposed in different locations and positions on the central processing unit, including on the bottom thereof.

It is an object of this invention to provide a portable computer that allows easy operation in locations that may not permit the use of traditional portable computers. Rather than requiring a flat resting surface for proper operation, the present portable computer may easily be operated while being held in one or both hands of the operator.

It is a further object of this invention to provide a portable computer for one-handed operation that incorporates a small keypad, the smaller requirements of which permits downsizing of the entire computer housing, resulting in a smaller unit that further enhances portability due to smaller size and lighter weight. Despite this miniaturization, computer performance need not suffer, since the processor and memory of a traditional portable computer may still be incorporated into the computer of the present invention. Furthermore, full functionality may be obtained with presently available expansion slots and ports. And as data storage hardware and communications peripherals develop, handheld portable computers of the present invention will rival present large desktop computers for processing power and functionality.

Other objects and advantages of the invention will become apparent from the following detailed description and from the appended drawings in which like numbers have been used to describe like parts throughout the several views.

DESCRIPTION OF THE PREFERRED EMBODIMENT

Figure 1:
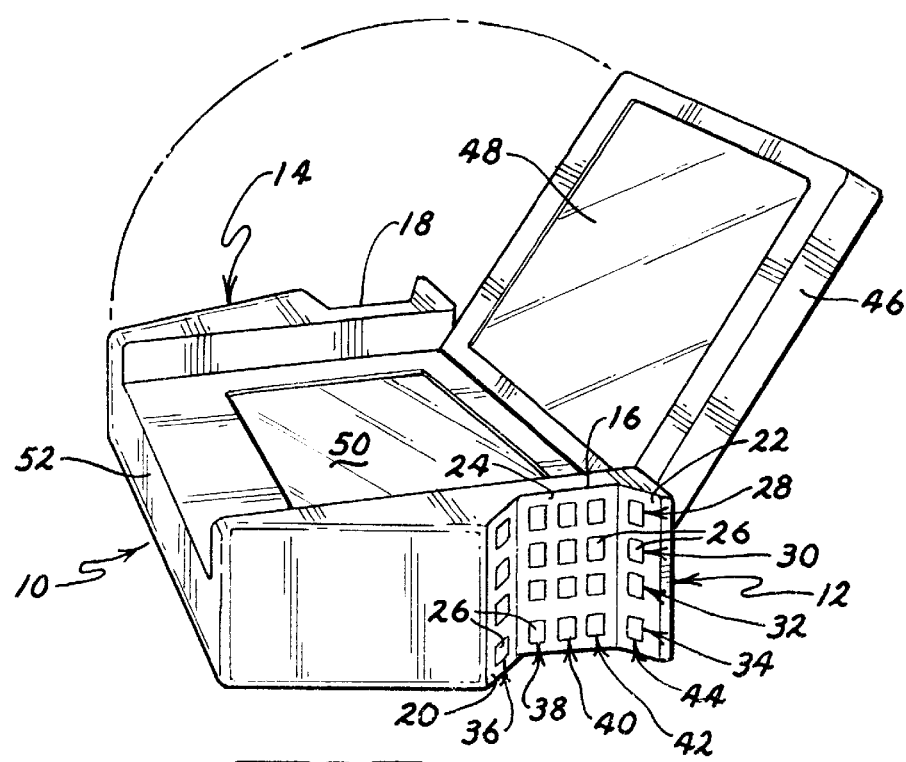
FIG. 1 is a perspective view of the preferred embodiment of the present invention with the hinged upper screen portion in the open position.
Figure 2:
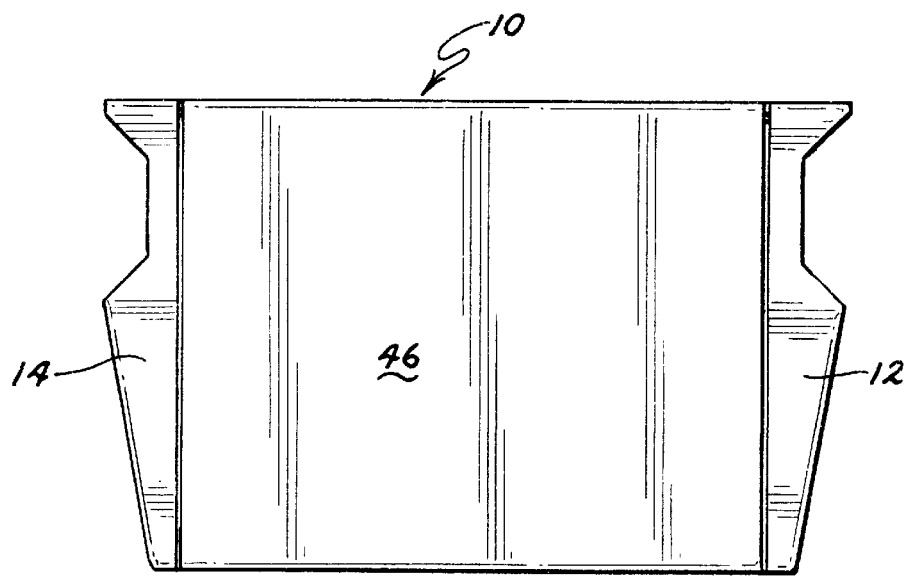
FIG. 2 is a top view of the preferred embodiment of the present invention with the hinged upper screen portion in the closed position.

With reference to the drawings, and in particular to FIG. 1, the portable computer for one-handed operation is generally indicated by reference numeral 10. For convenience, it is preferred that the computer 10 be equipped with identical first and second data entry terminals 12, 14 for controlling the operation of the computer. Each data entry terminal 12, 14 is by itself capable of controlling the full range of available functions of the computer 10. However, the presence of two such data entry terminals permits one, for example, to be dedicated to data input while the other is dedicated to cursor control. Data entry terminals 12, 14 each include first and second keypad portions 16, 18, respectively, which project from the right and left sides of computer 10. When using computer 10, the user grasps first data entry terminal 12 between the thumb and fifth finger of their right hand while grasping second data entry terminal 14 between the thumb and fifth finger of their left hand. Data input is accomplished by operating first and second data entry terminals 12, 14 with the three middle fingers of the two hands, respectively.

As may be seen, data entry terminals 12, 14 include keypad portions 16, 18 having a first obtuse, generally upwardly angled segment 20, a second obtuse, generally upwardly angled segment 22, and an intermediate segment 24. All three surfaces of first and second keypad portions 16, 18 are flat. Keypad portions 16, 18 preferably include twenty keys 26, arranged in four columns 28, 30, 32 and 34, respectively, and five rows 36, 38, 40, 42 and 44, respectively. Columns 28, 30 and 32 are preferably spaced an equal distance apart one from another, while column 34 is preferably spaced a distance somewhat greater from column 32. The distance between column 32 and column 34 should be large enough to be detectable to the touch of a keyboard operator.

As shown in FIG. 1, row 36 is positioned on first angled segment 20 of keypad portions 16, 18. Rows 38, 40 and 42 are positioned on intermediate segment 24, and row 44 is positioned on second angled segment 22. Keystrokes of predetermined combinations of keys result in alphanumeric characters or other software commands being transmitted to the program in use on the computer at the time. Similarly, predetermined keystroke combinations may result in cursor movement or other functions, depending on the selectable mode the keypad is set for at the time.

The preferred embodiment of portable computer 10 also includes a cover portion 46 including a first display screen 48. A second display screen 50 is also preferably included, and is positioned on the base 52 of portable computer 10, to which cover portion 46 is hingedly attached.

Within base 52 of portable computer 10 are located the elements required for operation of a portable computer, including a battery and the motherboard, to which may be attached a processor, memory chips, and other necessary components and circuitry. Base 52 may also include input/output ports that permit access to external components, such as a larger monitor, a printer, or an external floppy or hard disk drive. Finally, base 52 may also include additional ports for connection of removable internal devices, such as modems and removable hard drives. Additional, presently undeveloped components may also be permitted access to the computer through ports or other means, without departing from the basic structure of portable computer 10.

In use, portable computer 10 may be held in both hands of the operator, with the right hand entering data or operating instructions on first keypad 16 and the left hand entering data or operating instructions on second keypad 18. If preferred, portable computer may be rested on a support surface, such as the operator's knee if the operator is seated, but suitable performance may be obtained while holding the computer by grasping first and second data entry terminals 12, 14. First and second data display screens 48, 50 permit the operator to observe the progress or status of two separate programs simultaneously while operating the computer. For example, the operator may be inputting data into a word processing program on first display screen 48 while messages or data from an e-mail message a remote database being accessed via modem is displayed on second display screen 50.

Figure 3:
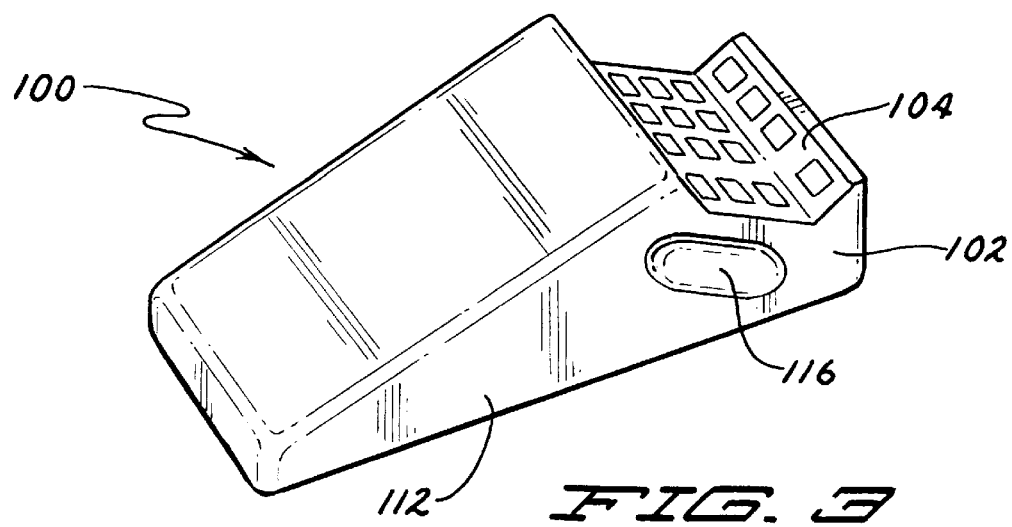
FIG. 3 is a per view of a second embodiment of the present invention.
Figure 4:
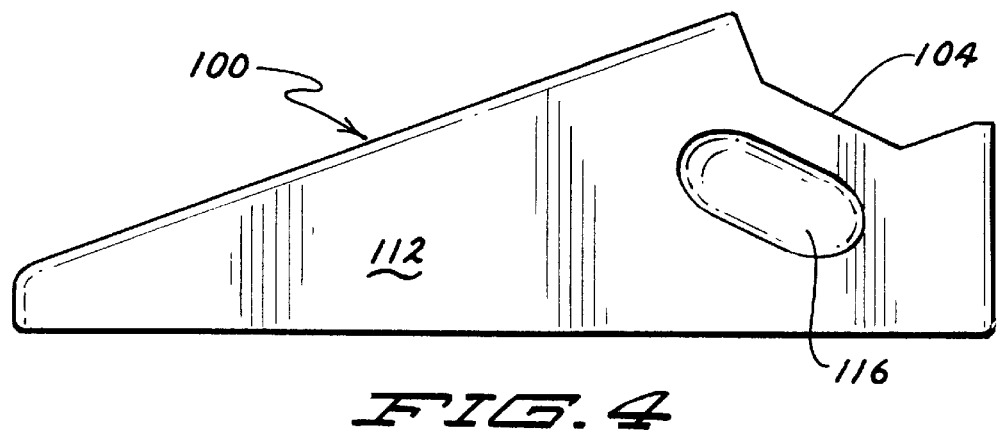
FIG. 4 is a right side view of the second embodiment of the present invention.
Figure 5:
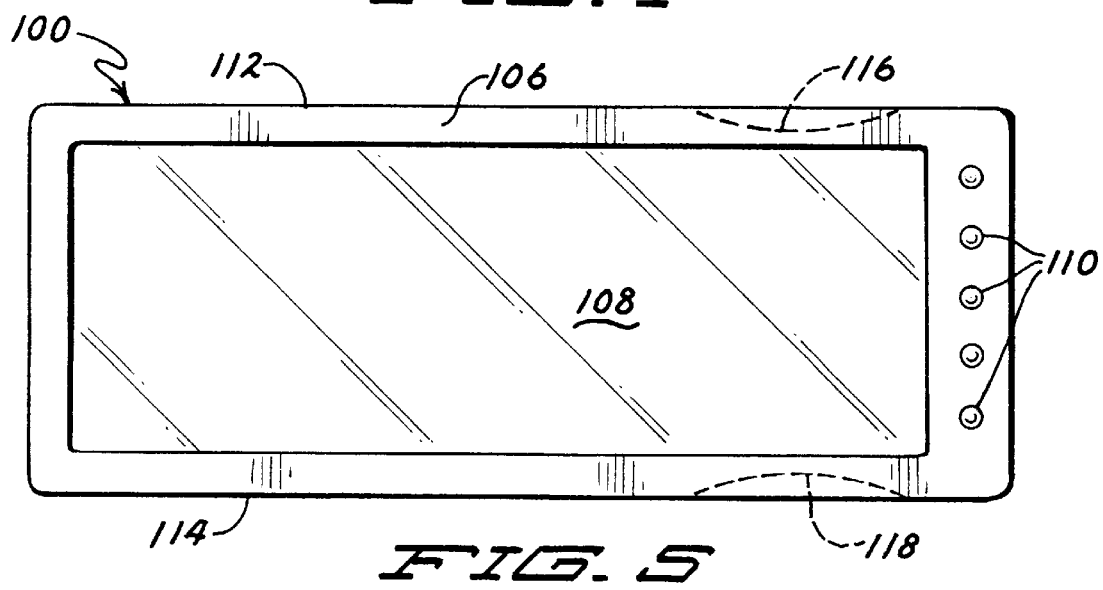
FIG. 5 is a bottom view of the second embodiment of the present invention showing the display screen thereof.

FIGS. 3, 4 and 5 illustrate a second embodiment 100 of the portable computer for one-handed operation. As with the other embodiments, computer 100 includes a data entry terminal 102 having a keypad portion 104. Keypad portion 104 of computer 100 is identical to that of first and second keypad portions 16, 18 of the embodiment illustrated in portable computer 10. On the bottom 106 of computer 100 is a single display screen 108. A number of indicator lights 110 may be positioned adjacent display screen 108. These lights may serve a number of different functions, including indicating whether a storage disk is being accessed or which mode keypad 104 is currently programmed to operate in. As indicated earlier, the complete range of computer functions may be addressed from the reduced-key keypad, requiring the keypad to be shifted between, for example, cursor mode and data entry mode. Right and left sides 112, 114 of computer 100 preferably include first and second indents 116, 118, respectively. Indents 116, 118 serve as locators for holding computer 100 during use. Preferably, when held, for example, by the operator's right hand, the operator's thumb would be positioned in indent 118 and their fifth finger would be positioned in indent 116. Computer 100 is, however, operable by either the left or right hand. As with preferred embodiment 10, personal computer 100 may include a number of ports, slots or other input/output terminals for data transfer or access to external devices. In use, portable computer 100 may be held in either hand of the user, with the three middle fingers of that hand entering data on keypad 104. If preferred, computer 100 may be turned upside down during data entry for easy viewing of data display screen 108.

Figure 9:
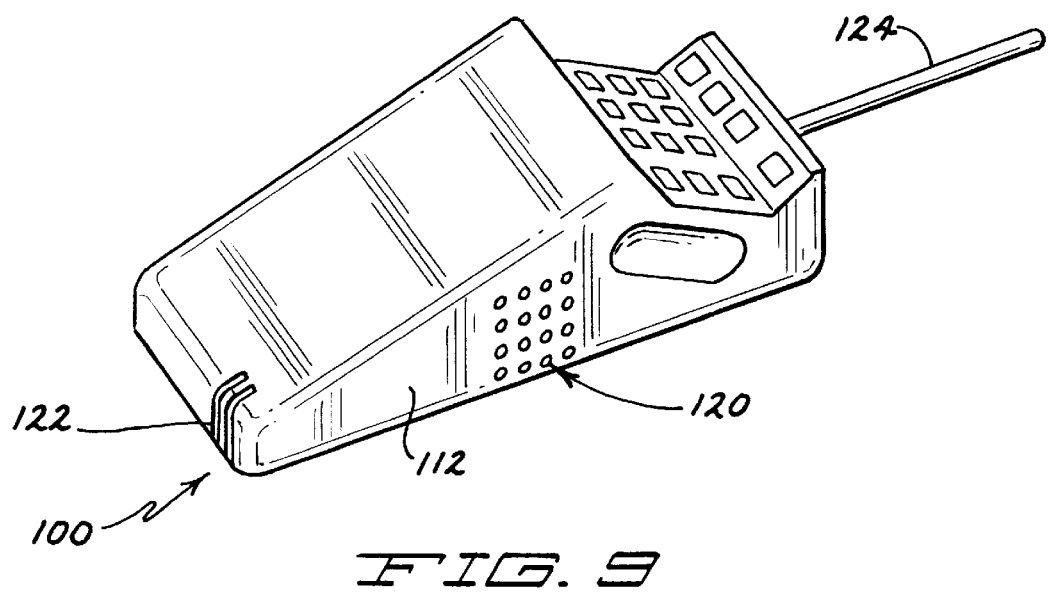
FIG. 9 is a perspective view of a modified version of the second embodiment, illustrated in FIG. 3.
Figure 10:
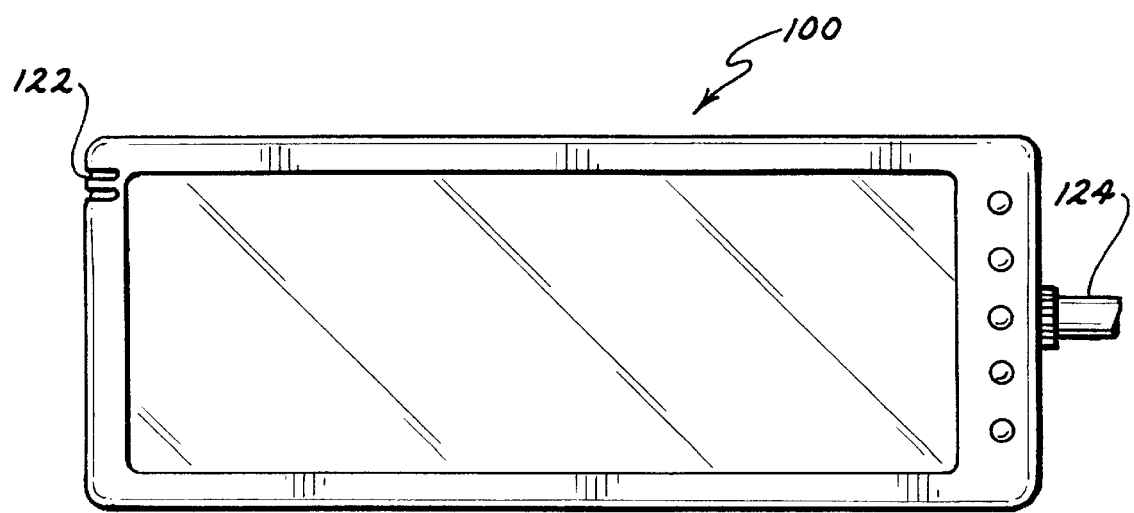
FIG. 10 is a bottom view of the modified version of the second embodiment.

FIGS. 9 and 10 depict a modified version of the embodiment illustrated in FIGS. 3, 4 and 5. In the modified version, computer 100 includes additional components that permit telephone access for both voice and data transmission. As may be seen, computer 100 also includes a speaker element 120 integral with right side 112, although the location of speaker element 120 is not essential to the proper operation of the modified computer. Similarly, an omnidirectional microphone element 122 is provided that is also integral with terminal 102. As with speaker element 120, the location of microphone element 122 is not essential to the proper operation of the modified computer. Also, an antenna 124 may be provided so that computer 100 may perform as a wireless telephonic device. With these modifications, it is intended that computer 100 may be used as a universal communicator. As such, computer 100 may be used for communication and data transmission over conventional telephone lines by any person, even those with severe handicaps. With appropriate software loaded into the memory of the computer, the keys of rows 38, 40, 42 and 44 and of columns 28, 30 and 32 may be programmed to generate one each of the twelve tones of the standard touch-tone telephone, enabling the user of the modified computer 100 to dial a phone number. If properly equipped as a wireless telephonic unit, computer 100 may then be used as a standard wireless telephone unit. Alternatively, it may be plugged into a standard wall jack for use as a typical home or office telephone, capable of communicating with any other telephone. However, if linked over telephone lines to another computer featuring a similar data entry terminal configuration and appropriate software, data may be transferred over telephone lines between the two computers using the keystroke combinations described above.

Figure 11:
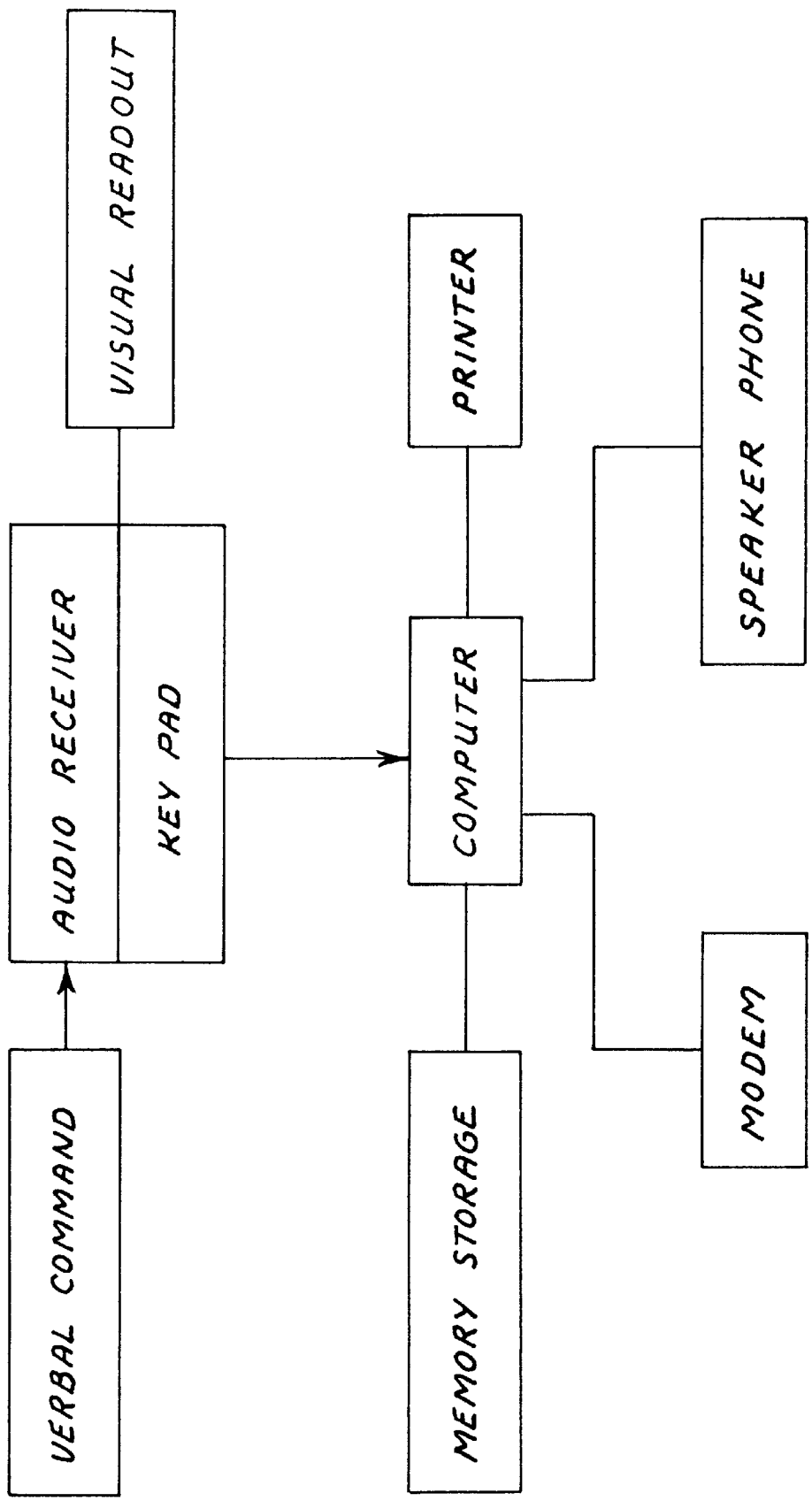
FIG. 11 is a flow chart illustrating the use of the features provided in the modified version of the second embodiment.

The flow chart in FIG. 11 illustrates the possible functions of modified computer 100. The communication features of computer 100 may be initiated by voice activation for transmission of verbal communication, such verbal communications being received by the audio pickup 122 built into the housing. Alternatively, data transmission may be accomplished by actuating the keys of keypad 104. Characters entered from keypad 104 will be displayed on the display screen 108. If the computer is capable of converting vocal instructions to text, the resulting text may also be displayed on display screen 108. Data that is entered through keypad 104 or microphone 122 is processed through the computer, where it may be sent to a modem for transmission through ordinary phone lines. The modem may be an internal modem installed within terminal 102, or it may be external, connected by a cable. During routine operation of the compute, data may be sent to a printer. Alternatively, data received through a telephonic transmission may also be printed out. In addition, data received from either the keypad or the telephonic transmission may be stored in a memory storage unit. This memory storage unit is preferably connected to the computer by a cable, since internal memory storage adds size and weight to the terminal. Finally, verbal communications may be performed using the computer as a simple speaker phone.

Figure 6:
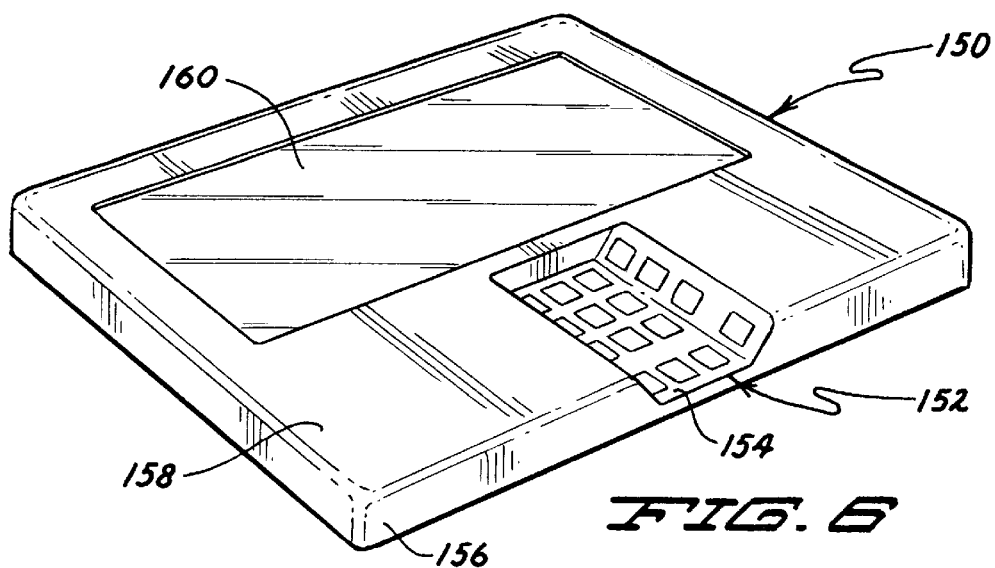
FIG. 6 is a perspective view of a third embodiment of the present invention;.
Figure 7:
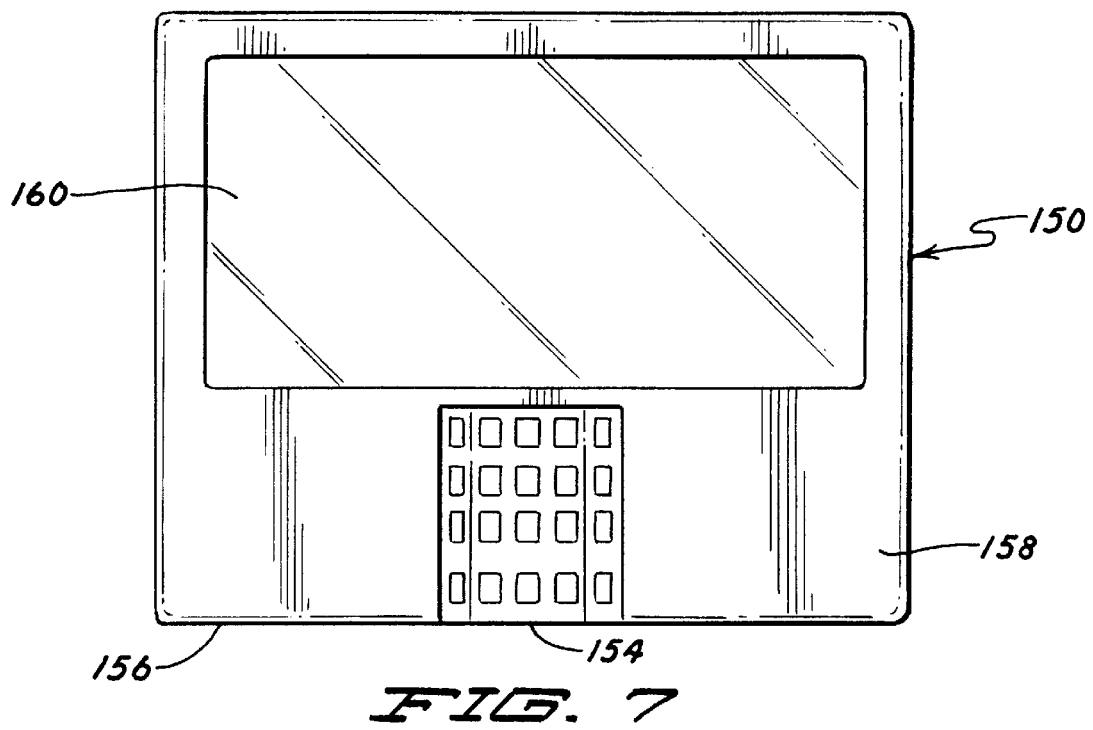
FIG. 7 is a top view of the third embodiment of the present invention.
Figure 8:
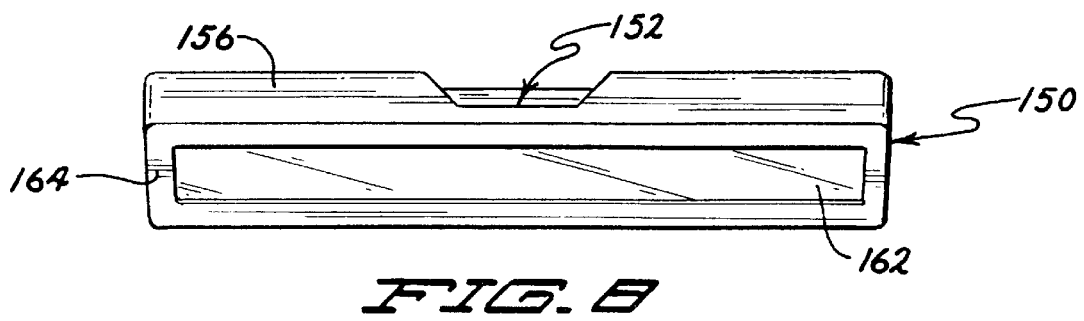
FIG. 8 is a right side perspective view of the third embodiment of the present invention, showing the display screen thereof and the location of the integral bent keyboard.

FIGS. 6, 7 and 8 illustrate a third embodiment 150 of the portable computer for one-handed operation. This tablet-style portable computer 150 again incorporates a data entry terminal 152 with a keypad 154 identical to that of the other two embodiments. Data entry terminal 152 is preferably positioned along the right side 156 of tablet-style computer 150. Preferably positioned on the top or upper surface 158 of computer 150 is a data display screen 160. Alternatively, as illustrated in FIG. 8, a data display screen 162 may be positioned on the bottom or lower surface 164 of computer 150. In use, tablet-style portable computer 150 may be held in a number of positions for convenient use. For example, with data display 160 positioned on upper surface 158, portable computer 150 may be held against the waist of the user by the left hand, positioned at the upper edge of the computer, while the right hand enters data through keypad 154. With data display 162 positioned on bottom surface 164, portable computer 150 held on the right forearm of the user while data is entered through keypad 154, which would be pointing downward, away from the user. The third embodiment 150, as well as the preferred embodiment 10, may each also be modified as described above for second embodiment 100.

While the preferred embodiments of the invention have been described, it should be understood that various changes, adaptations and modifications may be made therein without departing from the spirit of the invention and the scope of the appended claims.

What is claimed is:

1. A portable computer having a data processor, comprising:

at least one keypad having a multiplicity of manually actuable keys, said keypad including a generally flat intermediate segment having a lower edge and an upper edge, a first angled segment projecting generally upwardly from said upper edge of said intermediate segment and forming a first obtuse angle with said intermediate segment, and a second angled segment projecting generally upwardly from said lower edge of said intermediate segment, said second angled segment forming a second obtuse angle with said intermediate segment and positioned generally opposably to said first angled segment;

at least one data display screen for viewing data resulting from the keypad and computing operations of the portable computer; and communication means for linking the portable computer to telephone lines for voice and data transmission.

2. The portable computer described in claim 1, wherein said communication means comprises a modem.

3. The portable computer described in claim 2, wherein said communication means further comprises an antenna for wireless telephonic transmission.

4. The portable computer described in claim 1, further comprising:

a microphone member for receiving oral statements from at least one user of the portable computer; and a speaker member for projecting sounds received through said communication means.

5. The portable computer described in claim 4, wherein said communication means comprises a modem.

6. The portable computer described in claim 5, wherein said communication means further comprises an antenna for wireless telephonic transmission.

7. A portable computer having a data processor, comprising:

a base member containing the data processor;

a keypad mounted to said base member, said keypad having a multiplicity of manually actuable keys, said keypad including a generally flat intermediate segment having a lower edge and an upper edge, a first angled segment projecting generally upwardly from said upper edge of said intermediate segment and forming a first obtuse angle with said intermediate segment, and a second angled segment projecting generally upwardly from said lower edge of said intermediate segment, said second angled segment forming a second obtuse angle with said intermediate segment and positioned generally opposably to said first angled segment;

a data display screen for viewing data resulting from the keypad and computing operations of the portable computer, said data display screen being connected to said base member; and communication means for connecting the portable computer to telephone lines for voice and data transmission.

8. The portable computer described in claim 7, wherein:

said base member includes a top side and a bottom side, a left side and a right side;

said keypad projects outwardly from said top side of said base member; and said data display screen is mounted on and integral with said bottom side of said base member.

9. The portable computer described in claim 8, further comprising:

a first indent in said right side of said base member; and a second indent in said left side of said base member, whereby a user of the portable computer grasps the portable computer by placing the fingertips of their thumb and little finger in said first and second indents for grasping the portable computer during use.

10. The portable computer described in claim 9, wherein said communication means comprises a modem.

11. The portable computer described in claim 10, wherein said communication means further comprises an antenna for wireless telephonic transmission.

12. The portable computer described in claim 9, further comprising:

a microphone member for receiving oral statements from at least one user of the portable computer; and a speaker member for projecting sounds received through said communication means.

13. The portable computer described in claim 12, wherein said communication means comprises a modem.

14. The portable computer described in claim 13, wherein said communication means further comprises an antenna for wireless telephonic transmission.

\* \* \* \* \*